Patented Nov. 7, 1933

1,934,626

UNITED STATES PATENT OFFICE 1,934,626

MAKING POLYSULPHIDES

Adriaan Nagelvoort, Wilmington, Del., assignor to Delaware Chemical Engineering Company, Wilmington, Del., a corporation of Delaware No Drawing. Application November 8, 1932
Serial No. 641,805

6 Claims. (Cl. 23—138)

This invention relates to making polysulphides; and it comprises a process of quickly and economically making solutions of polysulphides without waste of sulphur or time, wherein sulphur is rendered miscible with water by a treatment with a dispersing agent, usually tannin, the dispersing agent being then often washed out and the sulphur in admixture with water is treated with an alkali, the alkali being either caustic soda or quicklime; all as more fully hereinafter set forth and as claimed.

Alkaline polysulphide solutions are in use for various purposes. Sodium sulphide, $Na_2S$, in solution takes up an excess of sulphur to form a deep red solution of sodium polysulphide, $Na_2S_x$, the $x$ having any value up to 5. Calcium forms a similar polysulphide. Both these polysulphides are in extensive use for various purposes. Commercially, they are made by dissolving sulphur in a solution of caustic soda or by reacting sulphur, lime and water, as the case may be. In either event, a certain amount of salts of thionic acids is formed, so that the product is not wholly a solution of a polysulphide. In the art, however, these solutions are called polysulphide solutions and the term will be so used hereinafter. A concentrated solution of sodium polysulphide carrying about 40 per cent solids is in extensive use in tanneries. A weaker solution of calcium polysulphide is largely used as an insecticide.

Sulphur is a material not readily wetted with water and this fact renders the manufacture of these polysulphide solutions inconvenient and wasteful. In heating ordinary sulphur with a solution of caustic soda, or with lime and water, the operation is tedious and during it, a great proportion of undissolved sulphur is produced in a form but little reactive with alkali. Additions of sulphur to boiling aqueous solutions of caustic soda float and are stirred in with difficulty. For this reason, the insoluble material removed and discarded commonly contains large amounts of sulphur and, on the other hand, alkali and sulphur cannot be united with the precision in proportions which is desirable.

I have, however, found that these objections are avoided and a short and simple method of manufacture, giving good utilization of sulphur and accurate proportioning, is made possible by using forms of sulphur readily wetted by water. As stated, sulphur does not mix readily with water, but the ordinary commercial forms of sulphur, on admixture with minute amounts of tannin and the like, undergo a surface change of some kind, making possible ready miscibility with water. As little as 2 pounds of tannin per ton of sulphur suffices to give this result. Other bodies having tanning properties, such as sulphite waste liquor products, also have the property of making sulphur miscible with water and can be used. After miscibility with water has been secured and the sulphur is wet, the tannin, etc., can be readily washed out, the sulphur retaining its property of miscibility with water. A washed, pure, miscible sulphur is thereby secured. On drying the purified miscible sulphur, it returns to its original properties with regard to water.

These miscible sulphur preparations readily mix with caustic alkali solutions without the annoying tendency to float exhibited by ordinary fine ground sulphur.

In one embodiment of the present invention, making a concentrated solution of sodium polysulphide, useful in the tannery, as a depilatory, etc., ordinary commercial fine ground sulphur is made miscible with the aid of tannin. After miscibility is secured, the tannin may or may not be washed out. A batch of wet sulphur containing about equal parts by weight of water and sulphur is heated. Into the hot aqueous suspension is introduced granulated commercial caustic soda, the particular amount of soda depending upon the proportion of sulphur wanted in the final polysulphide solution. In making a tannery preparation, about 1 pound of commercial caustic can be used for 4 pounds of sulphur or for 8 pounds of the stated 50 per cent suspension. The addition of the solid caustic soda raises the temperature and the whole mixture goes over into a concentrated solution of sodium polysulphide. Using soda in the proportion of 1 pound to 8 pounds of mixture, the result is a dark red clear solution containing about 50 per cent solids and ready for use in the tannery. There is no waste of sulphur by conversion into little reactive forms which must be settled out. Filtration and clarification are not ordinarily necessary.

Weaker solutions suitable for use as insecticides, replacing the old-time lime-salt-sulphur wash, can be made by suspending miscible sulphur in water and adding fine ground quicklime. For this purpose, a good proportion of reagent is 2 pounds of miscible sulphur and a pound of fine ground quicklime for each gallon of water. The mixture of sulphur and water should be hot when the lime is added and the mixture kept hot until a clear dark red solution is produced. There will be more or less deposit in this solution, due to gangue and other impurities in the lime. This is removed by filter pressing or settling. The clear, dark red liquid is ready for packaging or use.

In both the preparations just described, the ratio of sulphur to alkali corresponds to a saturated polysulphide.

In making commercial sodium polysulphide solutions, any desired amount of water can be used, but a strong solution is generally wanted. In making calcium polysulphide solutions, small amounts of water may be employed and concentrated materials made.

Miscible sulphur can be used with similar advantage in making other polysulphide solutions, as, for instance, potassium polysulphide. This latter can be made by substituting caustic potash for caustic soda in the example given. Similarly, strontium polysulphide and barium polysulphide can be made by substituting strontia and baryta for lime in the example given.

Ammonium polysulphide is sometimes wanted and the present method is applicable to its production. Miscible sulphur suspended in water reacts cleanly and completely with water of ammonia.

What I claim is:—

1. In the manufacture of polysulphide solutions, the process which comprises rendering sulphur miscible with water by contacting the same with a dispersing agent and reacting such miscible sulphur in suspension in water with a caustic alkali.

2. The process of claim 1 wherein the caustic alkali is commercial granulated caustic soda.

3. The process of claim 1 wherein the caustic alkali is fine ground quicklime.

4. The process of claim 1 wherein the dispersing agent is sulphite waste liquor solids.

5. In the manufacture of polysulphide solutions, the process which comprises rendering sulphur miscible with water by contacting the same with a small amount of tannin, dispersing said miscible sulphur in water and reacting said dispersion with a caustic alkali solution.

6. In the manufacture of polysulphide solutions, the process which comprises rendering sulphur miscible with water by dispersing the same with the aid of a small amount of a dispersing agent, washing out the dispersing agent and reacting said washed sulphur with a caustic alkali solution while still in its miscible state.

ADRIAAN NAGELVOORT.